2,395,298

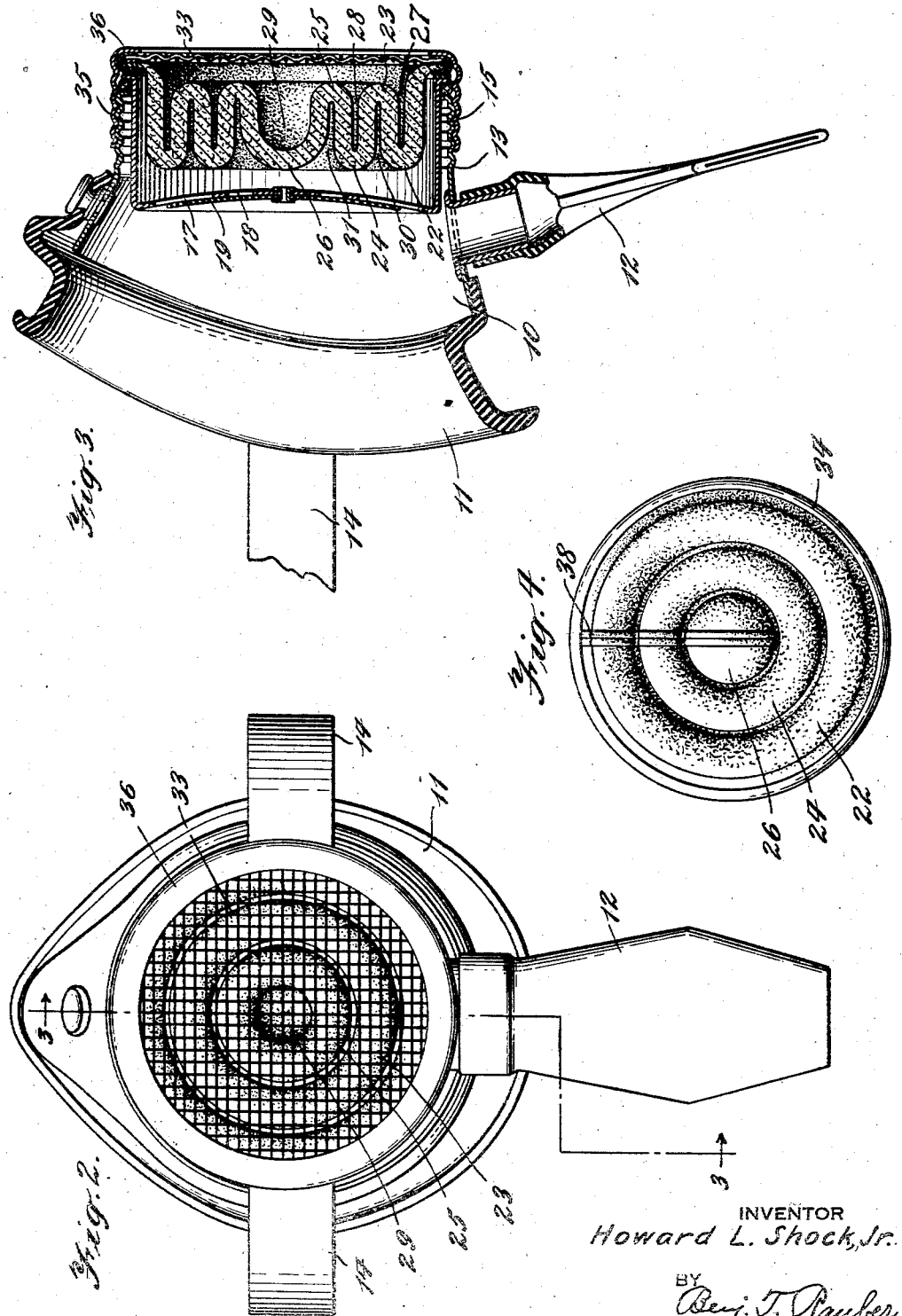
Feb. 19, 1946. H. L. SHOCK, JR 2,395,298
RESPIRATOR DUST FILTER
Filed June 10, 1944 2 Sheets-Sheet 2
INVENTOR
Howard L. Shock, Jr.
BY
Benj. T. Rauber
ATTORNEY Feb. 19, 1946.  H. L. SHOCK, JR  2,395,298
RESPIRATOR DUST FILTER
Filed June 10, 1944  2 Sheets-Sheet 1
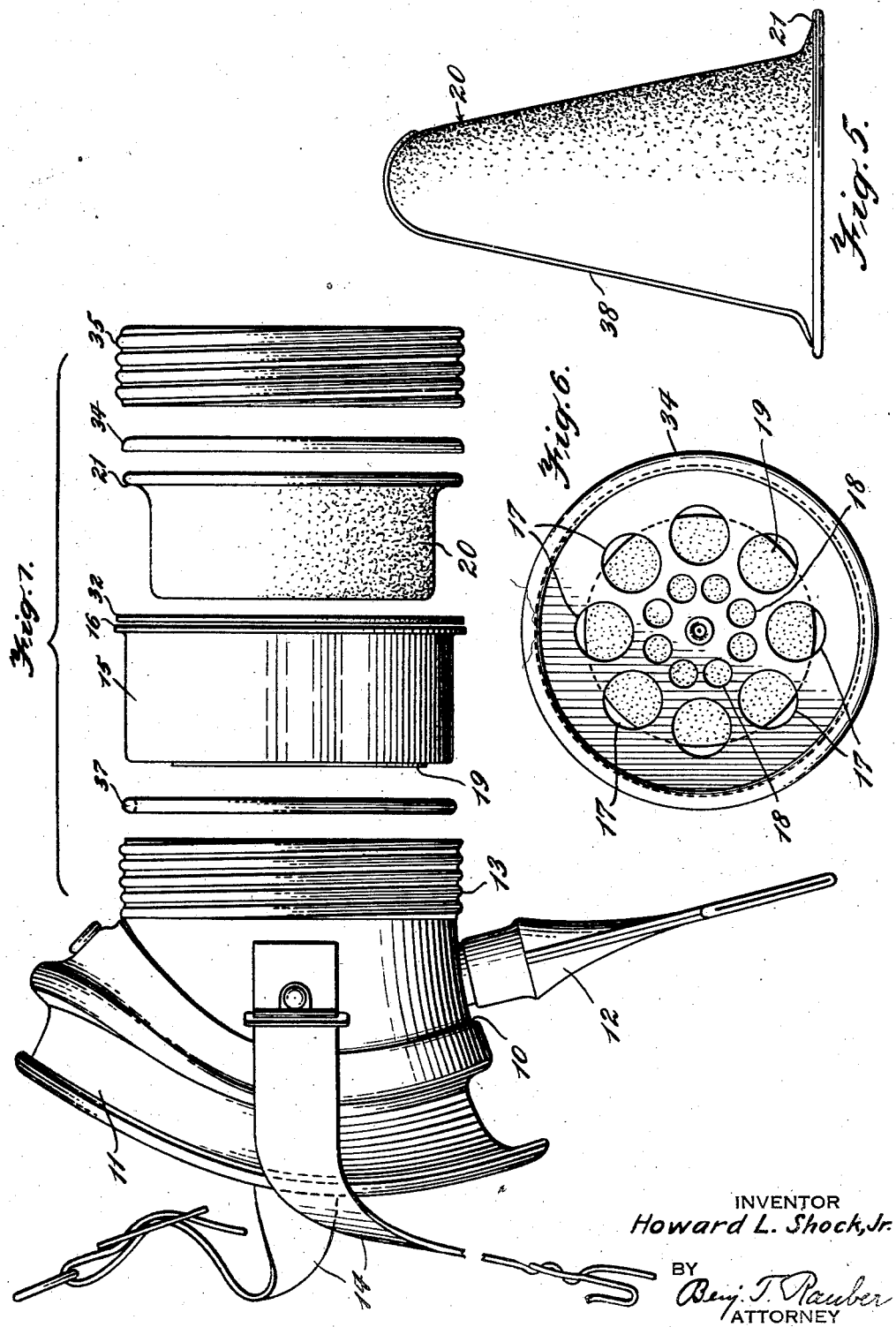
INVENTOR
Howard L. Shock, Jr.
BY
ATTORNEY Patented Feb. 19, 1946

UNITED STATES PATENT OFFICE 2,395,298

RESPIRATOR DUST FILTER

Howard L. Shock, Jr., Brooklyn, N. Y., assignor to Pulmosan Safety Equipment Corporation, Brooklyn, N. Y., a corporation of New York Application June 10, 1944, Serial No. 539,729

1 Claim. (Cl. 183—71)

My invention relates to a dust filter for respirators, that is to a filter and its mounting which may be used for filtering dust drawn into the respirator.

In order to filter dust from the air or gases with a small resistance to the flow of air it has been necessary to use filters of considerable area. To obtain the required area of filter with the flat or slightly curved filters heretofore used has necessitated considerable addition to the size and weight of the respirator rendering the respirator bulky and awkward in use.

In my present invention I provide an effective dust filter having a large filtering area in a compact space so that it may be mounted in much the same manner as a gas purifying canister. This filter may be easily and effectively mounted and sealed on the respirator or face mask without adding greatly to its size or bulkiness or weight, or may be used in a canister such as is used for purifying gases for a gas mask. The filter may be easily removed and freed from dust and replaced.

My present invention comprises a cup or shell to fit into a mask or canister or over the intake to a respirator in which is mounted in such a manner as to span the open end of the cup a filter of felt or other filtering material folded or corrugated in concentric folds to provide a much greater filtering surface than the cross-sectional area of the cup.

In use the dust-laden air or gas passing through the open end of the cup will enter the corrugations on the outer surface of the filter then pass through the felt into the inner corrugations and thence into the mask or respirator. The dust particles suspended in the air or gas entering the respirator will be left on the outer face of the felt and may be removed by removing the filter and tapping it to shake loose the dust or otherwise disengage it from the filtering surface.

Preferably the filter is protected from injury by a screen or other reticulated shield spanning the open end of the intake cup immediately outside of the filter. The felt filter and the reticulated protecting shield may be united at their edges by a ring crimped about them and then placed in position on the cup with a sealing ring between the crimped edge and the edge of the cup to prevent leakage of air. The filter assembly may then be secured to the mask or respirator by any suitable means such as a screw threaded flanged ring that may be screwed onto the respirator.

The various features of my invention are illustrated by way of example in the accompanying drawings in which—

Fig. 1 is a side elevation showing the respirator and the filter elements separated or expanded to show the construction of each element;

Fig. 2 is a front view of the respirator and filter element assembled;

Fig. 3 is a vertical section taken on the line 3—3 of Fig. 2;

Fig. 4 is a front view of the felt filter element;

Fig. 5 is a side view of the filtering felt before being folded into its corrugated shape, and Fig. 6 is a view of the filter cup taken from the right of Fig. 1.

In the specific embodiment of the invention illustrated in the accompanying drawings the invention is applied to a respirator or mask comprising a body 10 of substantially rigid material, such as aluminum, which may be bent to accommodate changes in shape, and a rubber face-fitting ring 11 which yields under pressure to fit the contours of the face of the wearer.

The body 10 is provided with the usual outlet valve 12. The forward end of the respirator body 10 is extended in a substantially circular extension 13 having screw threaded ridges therein. The usual fastening strap 14 is also provided. The filtering element of the present invention fits into the circular extension 13.

The filter of the present invention comprises a cup 15 the outer end of which is opened and turned outwardly to form a flange 16 while the inner end is provided with a series of openings 17 and 18 closed partly by a circular flexible flap 19 secured centrally on the outer face of the cup to provide an intake valve to the body 10, it being understood that the flap will be bent away from the openings 17 and 18 when air is drawn through the cup into the mask but will close against these openings to prevent air from passing freely in reverse direction and cause it to pass outwardly through the exhaust valve 12.

Within the cup 15 is provided a filtering felt 20 having an edge or flange 21 that fits onto and covers the flange 16 and which then extends in a succession of concentric folds or corrugations 22, 23, 24 and 25 about a central larger corrugation 26. This provides on the outer face of the felt a number of concentric recesses 27, 28, and a central recess 29, into which air may pass and from whence it may pass through the felt into the space about the corrugations and into concentric corrugations 30, 31 communicating with the space within the mask or respirator. It will be understood that the felt filtering element effectively spans the cross-sectional area of the cup 15 and is effectively sealed against the flange 16 by means of a circular seal, such as a felt ring 32, so that air may not pass into the cup 15 except through the felt filtering element.

To protect the felt from injury a shield or screen 33 of reticulated material such as wire mesh is mounted on the outer face of the edge 21 of the felt so as to span the area covered by the felt. This screen may be secured to the felt as a unit by means of a flanged ring 34 crimped about the assembly of screen and felt. Thus the felt and its screen may be removed from the cup 15 for cleaning or replacement purposes.

The filter cup and assembly of felt and screen may be secured on the circular extension 13 by any suitable means that will hold in place. The simple means shown in the specific example is a screw threaded ring or collar 35 adapted to screw onto the threads of the extension 13 and having a flange 36 to abut against the crimped ring 34 and hold the cup and filter securely in position on the respirator or mask.

In order to seal the cup 15 on the extension 13 so as to prevent leakage of unfiltered air a sealing ring 37 is provided between the end of the circular extension 13 and the flange 15 of the cup 15. This sealing ring may be of any suitable material, such as felt or a resilient plastic. It is conveniently formed, for example, by joining the two ends of a cord, preferably of circular cross-section, into a ring of slightly less diameter than the outside diameter of the cup 15 so that it may be stretched slightly and rolled onto the cup against the flange 16 before the cup 15 is inserted into the circular extension 13.

The sealing ring may be made of any suitable plastic of natural or synthetic origin as, for example, one of the polyvinyl plastics. It may be of any such composition provided it has the necessary elasticity and resilience.

It will be apparent that when the flange 16 of the cup is brought with the assembled sealing ring 13 tightly against the edge of the projection and then covered with the assembly of filter and screen which is then secured by the ring 35, the filter will be securely in place and will provide an extensive filtering area in a very small compact space.

The felt itself may be formed in any suitable way. It may, for example, be formed first into a cone-shaped body, as shown in Fig. 5, with the outwardly flaring flange 21 at its open end. This could be formed as a seamless structure but is more cheaply formed by cutting a suitable flat shape and then joining it on a seam as indicated at 38 in Figs. 4 and 5, after which the cone may be shaped and then folded into the corrugations as shown in Figs. 3 and 4.

It will be understood that the most convenient form for the cup 15 and other filtering elements and for the extension 13 is one of circular cross-section. It will also be understood that structures of other cross-section might be used embodying the invention.

It will be apparent from the above that my invention provides a filtering element having an extensive filtering area in a compact small space and that it can be inserted and used as a unit either in a face mask as shown or in a canister either alone or with gas purifying materials.

What I claim is:

A respirator having a cylindrical intake, a cup fitting into said intake and having a flanged end, a sealing ring of resilient stretchable material normally of slightly less diameter than the diameter of said cup mounted on said cup between its flange and the open end of said cylindrical intake, a filtering felt within said cup and having a flange fitting the outer flange of said cup, a sealing ring between the flange of said cup and the flange of said felt, a protecting screen on the outer face of said felt and fitting against the outer surface of said flange and means for securing said screen, said felt, and said cup onto the cylindrical intake of said respirator.

HOWARD L. SHOCK, Jr.